United States Patent [19]

Schmidt

[11] 3,924,123

[45] Dec. 2, 1975

[54] MEASUREMENT OF SECOND VIRIAL COEFFICIENTS

[75] Inventor: Thomas W. Schmidt, Bartlesville, Okla.

[73] Assignee: Phillips Petroleum Company, Bartlesville, Okla.

[22] Filed: May 6, 1974

[21] Appl. No.: 467,251

[52] U.S. Cl. .................................. 250/251; 250/287

[51] Int. Cl.² .......................................... G01N 11/02

[58] Field of Search ............ 250/251, 287, 288, 289

[56] References Cited

UNITED STATES PATENTS

| | | | |
|---|---|---|---|
| 3,080,754 | 3/1963 | Johnson | 250/288 |
| 3,340,395 | 9/1967 | Webb | 250/287 |
| 3,431,451 | 3/1969 | Brunnée et al. | 250/288 |
| 3,668,383 | 6/1972 | Carroll | 250/288 |

OTHER PUBLICATIONS

"A Cross Correlation Chopper Molecular Beam Modulation", Hirschy et al., Rev. of Sci. Ins., Vol. 42, No. 3, Mar. 1971, pp. 281–283, 250–251.

*Primary Examiner*—James W. Lawrence
*Assistant Examiner*—B. C. Anderson

[57] ABSTRACT

The second virial coefficient of a gaseous mixture of first and second constituents is measured by passing a molecular beam of the gaseous mixture from a source to a detector spaced therefrom. The velocity distribution of each constituent of the mixture passing from the source to the detector is determined from measurements of the time of flight of each constituent from the source to the detector. The temperature of the beam constituents is also measured. From these measurements, the second virial coefficient is calculated.

9 Claims, 4 Drawing Figures

MOLECULAR BEAM SOURCE
MASS SPECTROMETER
P 11c 11b 11a
12c 12b 12a
13 10 14 15 16 16a 17 17a 18 19 20 21 23 24

MEASUREMENT OF SECOND VIRIAL COEFFICIENTS

Considerable work has been done in recent years to design processes for the efficient liquefaction and low temperature separation of gaseous mixtures. However, accurate enthalpy data for the mixtures are needed in order to avoid inclusion of expensive safety factors in the designs. One of the fundamental equations of state which describes the pressure-volume-temperature behavior of gases is:

$$\frac{PV}{RT} = 1 + \frac{B}{V} + \frac{C}{V^2} + \cdots \qquad (1)$$

where P is pressure, V is molal volume, R is the gas constant, T is the absolute temperature, in degrees Kelvin, B is the second virial coefficient and C is the third virial coefficient. While some experimental data are available for determining second virial coefficients of pure hydrocarbons, very little data are available for mixed gases from which mixed second virial coefficients may be directly calculated. In many practical applications, only the first two terms of the right-hand side of the foregoing equation are necessary. Thus, only the second virial coefficient is needed.

In accordance with this invention, a method is provided for calculating the second virial coefficient of a gaseous mixture of first and second constituents. This method involves establishing a molecular beam of a mixture of the two constituents. The beam is passed from a source through an evacuated chamber to a detector, such as a mass spectrometer. A chopper can be positioned in the beam so that the times of flight of the beam constituents from the chopper to the detector can be measured. This permits a determination of the velocity distribution of each constituent of the beam to be made. The temperature of the constituents forming the beam is also measured. Equations are provided for calculating the second virial coefficient of the gaseous mixture from these measurements.

In the accompanying drawing.

Figure 1:
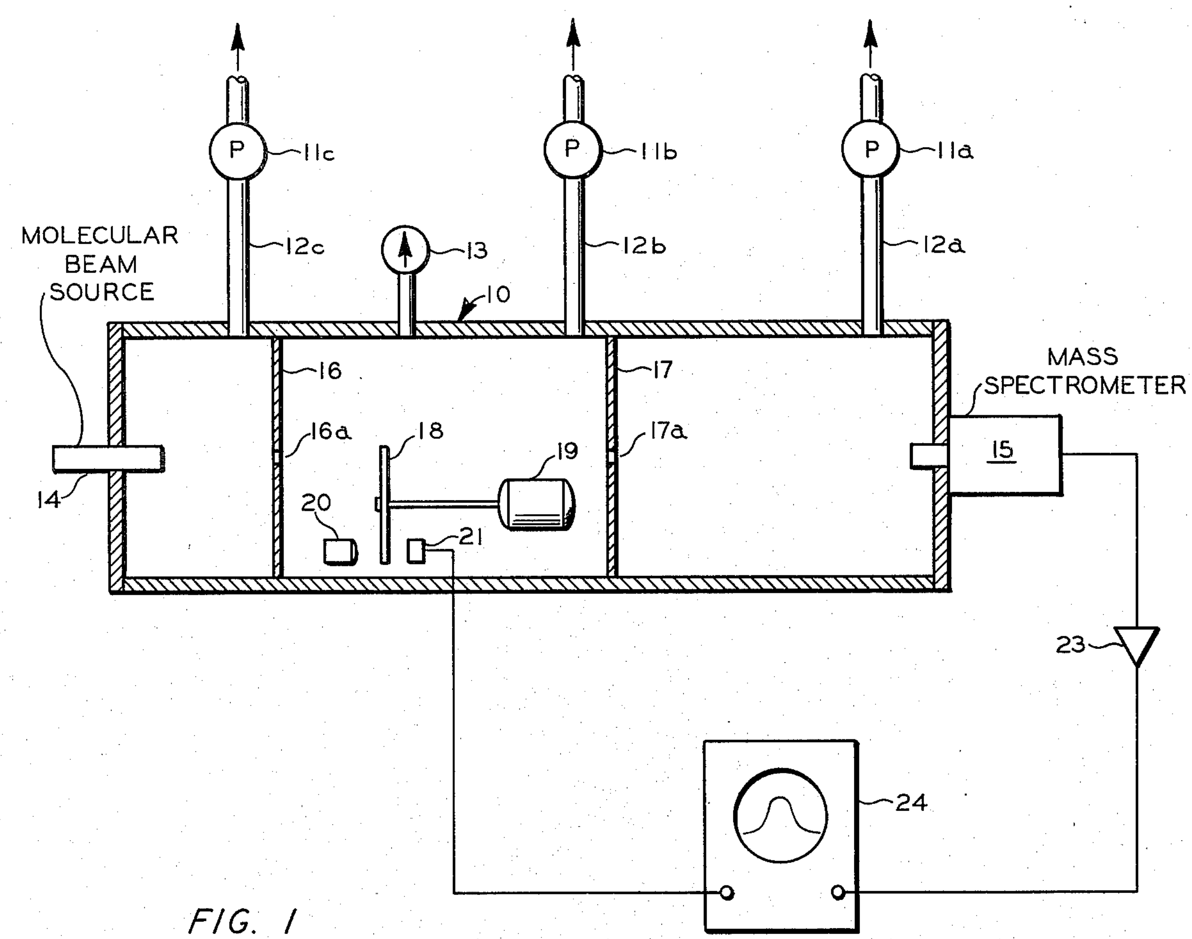
FIG. 1 is a schematic representation of apparatus which can be employed to make the measurements utilized in the method of this invention.

Referring now to the drawing in detail and to FIG. 1 in particular, there is shown a housing 10, the interior of which is maintained at a relatively low pressure by vacuum pumps **11*a*, 11*b* and 11*c* which are connected to the housing by respective conduits 12*a*, 12*b* and 12*c*. A pressure gauge 13 can communicate with the housing to provide a measurement of the pressure therein. A molecular beam source 14 is disposed in one end of the housing to provide a beam of molecules of a gaseous mixture to be analyzed. Molecules emitted from source 14 pass through apertures 16*a* and 17*a* of respective plates 16 and 17 to impinge on a detector at the opposite end of the housing. This detector can advantageously be a mass spectrometer 15**.

Figure 2:
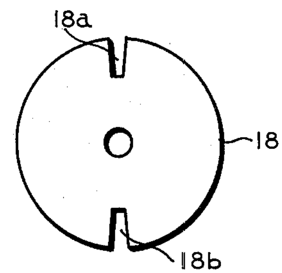
Fig. 2 illustrates the rotatable disk employed in the apparatus of FIG. 1.

A disk 18 is positioned within housing 10 such that the periphery of the disk intersects the beam directed from source 14 to detector 15. As illustrated in FIG. 2, the periphery of disk 18 is provided with slots 18a and 18b. Disk 18 is rotated by a motor 19 such that the molecular beam is blocked except when one of the slots is in the beam. A light source 20 and a photocell 21 are positioned such that a beam of light is transmitted through slot **18*b* when the molecular beam is transmitted through slot 18*a*, for example. The output signal from mass spectrometer 15 is applied through a suitable amplifier 23 to a detector 24. A signal from photocell 21 is also applied to detector 24 so that the measured beam is recorded as a function of time with respect to passage of the beam through disk 18**.

Figure 3:
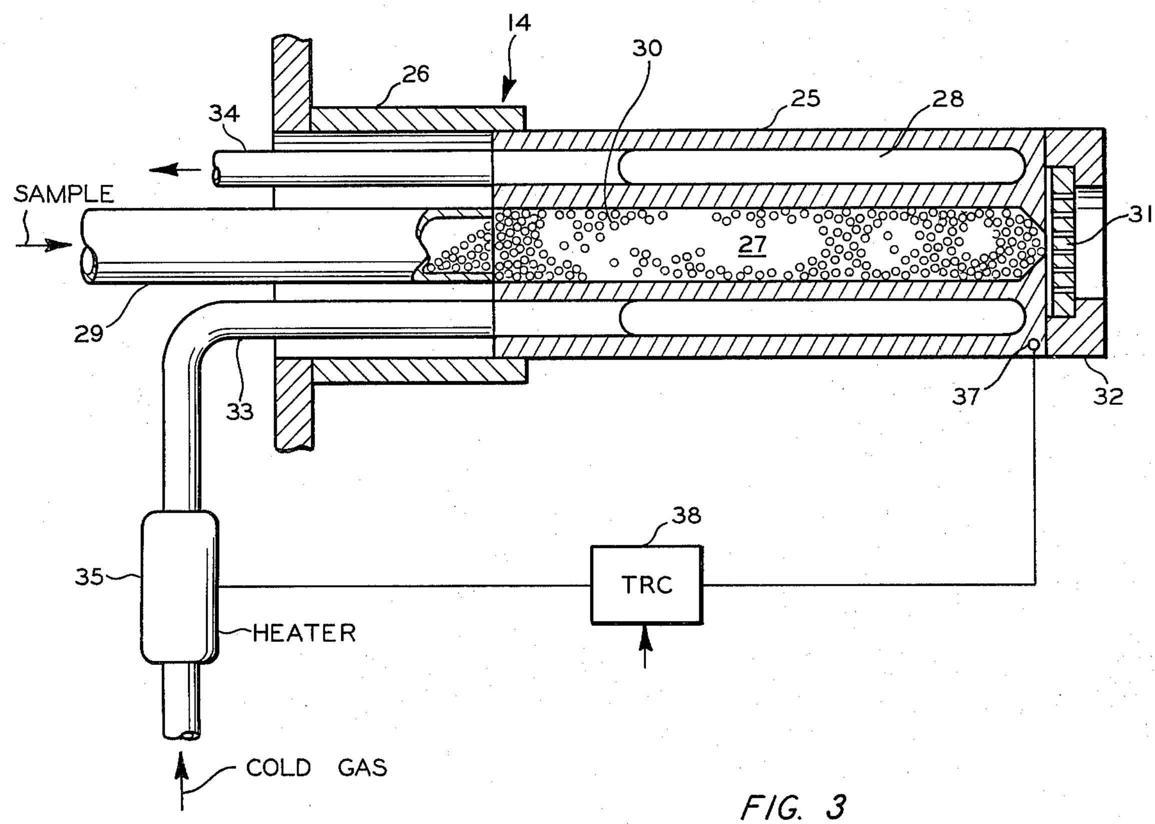
FIG. 3 is a detailed view of the molecular beam source of FIG. 1.

Source 14 is illustrated in detail in FIG. 3. A body member 25 extends into housing 10 and is secured to the wall of housing 10 by a sleeve 26. Member 25 is provided with a central chamber 27. An annular chamber 28 is formed in member 25 to surround chamber 27. A conduit 29 is connected to member 25 so that a gas sample introduced through conduit 29 enters chamber 27. The interior of chamber 27 is filled with copper shot 30 to provide efficient heat exchange between the gas sample and member 25. A disk 31, which has a plurality of capillary openings therethrough, is secured to the end of member 25 by a retaining ring 32. Gas molecules introduced through conduit 29 flow through chamber 27 and enter the interior of housing 10 through the capillaries formed in disk 31.

A conduit 33 communicates with one side of annular chamber 28, and a conduit 34 communicates with the opposite side of the chamber. A cold gas can be introduced through conduit 33 and vented through conduit 34, whereby circulation of this cold gas through chamber 28 results in cooling of the gas sample as it passes through the heat conducting metal shot 30. A heater 35 is disposed in inlet conduit 33 to permit the temperature of the cold gas to be adjusted. A temperature sensing element 37 is secured to member 25 to provide a signal representative of the temperature of the member. This signal is applied to the input of a temperature recorder-controller 38. Controller 38 adjusts heater 38 so as to maintain member 25 at a predetermined temperature, as selected by the setpoint signal to controller 38.

In conducting the method of this invention, a sample of a gaseous mixture to be analyzed is introduced through conduit 29. If the gaseous mixture is methane and propane, the sample can comprise about 95% by volume methane and 5% propane, for example. The proportion is not critical, but it has been found that best results are obtained when the lighter constituent is present in the major percentage. Controller 38 is set to maintain a preselected temperature and vacuum pump 11 is operated to maintain a preselected pressure within housing 10. In one specific embodiment of this invention, the distance from plate 31 to plate 16 can be 5 centimeters, the distance from plate 16 to the chopper can be 12 centimeters, and the distance from the chopper to detector 15 can be 62 centimeters. Disk 18 can be rotated at 20 cycles per second.

Figure 4:
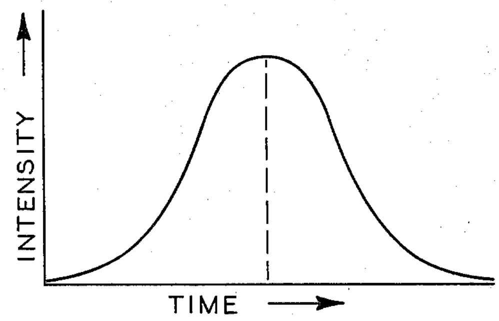
FIG. 4 is a graphical representation of a typical velocity distribution signal obtained utilizing the apparatus of FIG. 1

The mass spectrometer is set initially to measure a mass representative of one of the sample constituents. In the methane-propane example, mass 43, for example, can be measured to detect propane. Detector 24 can be a Model 1064 Fabri-Tek signal averager, for example, manufactured by Nicolet Instrument Corp., 5225 Verona Rd., Madison, Wis. 53711. This instrument establishes a signal of the type illustrated in FIG. 4 on the oscilloscope display. The "time" values are representative of the time of flight of propane molecules from disk 18 to detector 15. The "intensity" values are representative of the number of propane molecules reaching detector 15 at a given time. The mass spectrometer is then set to measure methane at mass 16, for example. A second curve of the type shown in Fig. 4 is obtained. The foregoing procedure is then repeated a number of times at selected temperatures and pressures. The temperatures established by controller 38 can vary from ambient temperature down to about −150° C., for example. Of course, other temperatures can be employed if it is desired to determine the second virial coefficient at other temperatures. Suitable pressures within source 14 are generally below about 6 torr. The time corresponding to the peak in the curve of Fig. 4, as shown by the dotted line, is representative of the most probable time of flight of the molecules being measured. From this time, the most probable velocity of the molecules can be determined, based on the distance between disk 18 and the detector.

The second virial coefficient $B_{ij}$ of the gaseous mixture of constituents $i$ and $j$, methane and propane, respectively, in the above example ($j$ being the dilute constituent), can be calculated from the formula $$B_{ij} = 2\pi \text{No} \int_0^\infty (1 - \exp[-U_{ij}(r)/kT])\, r^2 dr \qquad (2)$$

where No is Avagadro's Number, $k$ is the Boltzmann constant, $T$ is the absolute temperature of the gas sample, in degrees Kelvin, and $U_{ij}(r)$ is the potential energy function as given by the Lennard-Jones (12-6) potential where $r$ is the intermolecular distance, see J. O. Herschfelder, C. F. Curtiss and R. B. Bird, "Molecular Theory of Gases and Liquids," John Wiley & Sons, New York, 1964. The function $U_{ij}(r)$ can be determined from the formula $$U_{ij}(r) = 4\,\epsilon_{ij}\left[\left(\frac{\sigma_{ij}}{r}\right)^{12} - \left(\frac{\sigma_{ij}}{r}\right)^{6}\right] \qquad (3)$$

where $$\epsilon_{ij} = \epsilon_{ii}\left(\frac{\sigma_{ii}}{\sigma_{ij}}\right)^{6}\left(\frac{m_i}{m_j}\right)^{1.6875}\left(\frac{\delta_j}{\delta_i}\right)^{3.375}\left(\frac{\delta_j^2-1}{\delta_i^2-1}\right)^{2.5} \qquad (4)$$

The quantity $\epsilon_{ij}$ is the depth of the potential well and $\sigma_{ij}$ is the intermolecular distance at which the attracting forces of the potential equal the repulsive forces. With the exception of $\sigma_{ij}$, all of the variables of equation (4) are available for most gases in tables in the literature or can be measured. The value of $\sigma_{ij}$ can be closely estimated from the relationship $$\sigma_{ij} = (\sigma_{ii} + \sigma_{jj})/2 \qquad (5)$$

In equation (4) the quantity $\delta_j$ is defined by the relationship $$\delta_j = \frac{V_{oj}}{V_{Bj}} \qquad (6)$$

where $V_{Bj}$, the most probable velocity of the Maxwellian beam distribution of constituent $j$, is defined as $\sqrt{3\alpha^2 j/2}$, where $\alpha_j$ is the most probable velocity of such constituent and is equal to $(2kT/m_j)^{1/2}$, with $m_j$ being the mass of molecule $j$. The quantity $V_{oj}$ is the measured velocity, at the peak of the curve of Fig. 4, of constituent $j$. The quantity $\delta_i$ is defined in a similar manner.

Based on the foregoing equations, the following evaluation parameters were used in calculating the second virial coefficient of a methane-propane mixture at 25° C.

| $m_i$ | $m_j$ | $\delta_i$ | $\delta_j$ | $\sigma_{ii}/\sigma_{jj}$ |
|---|---|---|---|---|
| 16.036 | 44.076 | 1.401 | 1.762 | 0.9208 |

This gave a second virial coefficient of −113 ± 9 cc/mole for the mixture. By making a series of measurements at different temperatures, the coefficient can be determined at different temperatures.

While this invention has been described in conjunction with a presently preferred embodiment, it obviously is not limited thereto.

What is claimed is:

1. The method of obtaining data from which the second virial coefficient of a gaseous mixture of first and second constituents can be calculated, which method comprises the steps of passing a molecular beam of a gaseous mixture of said first and second constituents to be analyzed through a time of flight zone from a source to a detector spaced from the source, separately measuring the velocity distribution of each of said first and second constituents of the beam, and measuring the temperature of the constituents forming the beam, such temperature measurement being conducted independently of the measured velocity distribution step.

2. The method of claim 1 wherein the constituent of said mixture having the greater molecular weight is present in said mixture in a minor amount.

3. The method of claim 2 wherein the said constituent of greater molecular weight comprises about 5% by volume of said mixture.

4. The method of claim 1 in which the measurements are repeated at least once with the temperature of the constituents forming the beam being different from the temperature at which the first measurements are made.

5. The method of claim 1, further comprising calculating the second virial coefficient of said mixture from the measured temperature and from measurements of the most probable velocities of said first and second constituents of said beam.

6. The method of claim 1 wherein the beam is blocked periodically at a region between said source and said detector so that pulses of molecules are received at said detector, and separately measuring the times of flight of molecules of each constituent from said region to said detector.

7. The method of claim 1, further comprising controlling the temperature of the gaseous mixture to be analyzed so that the measured temperature is a constant temperature.

8. The method of claim 7, further comprising subsequently changing the temperature of the gaseous mixture to be analyzed to a second temperature, controlling the temperature of the gaseous mixture to maintain the temperature of the gaseous mixture constant at said second temperature, and repeating said measuring steps.

9. The method of claim 5 wherein the calculation is made from the formula $$B_{ij} = 2\pi No \int_0^\infty (1 - \exp[-U_{ij}(r)/kT])r^2dr$$

where $B_{ij}$ is the second virial coefficient of the gaseous mixture of first and second constituents $i$ and $j$, respectively, No is Avagadro's Number, $k$ is the Boltzmann constant, $T$ is the measured temperature of the constituents in degrees Kelvin, and $U_{ij}(r)$ is the potential energy function as given by the Lennard-Jones potential where $r$ is the intermolecular distance.

* * * * *